United States Patent [19]

Bauer et al.

[11] 4,378,399
[45] Mar. 29, 1983

[54] MULTI-PART ADHESIVE LAMINATES WITH ACTIVATOR CARRYING ELEMENT

[75] Inventors: Herbert Bauer, Lutry, Switzerland; Gerhard Piestert, Schriesheim, Fed. Rep. of Germany

[73] Assignee: USM Corporation, Farmington, Conn.

[21] Appl. No.: 225,751

[22] Filed: Jan. 16, 1981

Related U.S. Application Data

[63] Continuation of Ser. No. 66,657, Aug. 15, 1979, abandoned.

[30] Foreign Application Priority Data

Aug. 19, 1978 [GB] United Kingdom ............... 33951/78

[51] Int. Cl.$^3$ ....................... B32B 7/00; B32B 27/00; C09J 5/02
[52] U.S. Cl. .................................. 428/220; 156/313; 156/306.9; 428/246; 428/261; 428/286; 428/287; 428/288; 428/289; 428/290
[58] Field of Search ............... 156/308, 313; 428/246, 428/220, 261, 286, 287, 288–290

[56] References Cited

U.S. PATENT DOCUMENTS 3,533,877 10/1970 Cook .................................. 156/313
3,928,110 12/1975 Arconti .............................. 156/308

*Primary Examiner*—Marion McCamish
*Attorney, Agent, or Firm*—John P. Morley

[57] ABSTRACT

The invention provides improved bonding methods and bonded laminates using multi-part adhesive compositions having first and second parts. The first part of the adhesive composition comprises free radical polymerizable monomers and a source of free radicals; the second part comprises an activator for initiation of polymerization of the monomer. According to the invention, flexible, activator carrying elements are positioned between layers of the first part to provide effective bonding between substrate surfaces which may be spaced apart from each other by relatively large gaps.

17 Claims, 1 Drawing Figure

MULTI-PART ADHESIVE LAMINATES WITH ACTIVATOR CARRYING ELEMENT

CROSS REFERENCE TO RELATED APPLICATIONS

This application is a continuation of Application Ser. No. 66,657 filed Aug. 15, 1979 and now abandoned.

FIELD OF THE INVENTION

This invention relates to methods providing improvements in bonding and to improved bonded laminates.

DESCRIPTION OF THE PRIOR ART

Multi-part reactive fluid adhesive compositions are known which are at least substantially solvent free, and cure by polymerization of monomeric components to provide strong adhesive bonds between surfaces of many different materials. These multi-part adhesive compositions usually comprise two parts. The first part of the composition comprises polymerizable acrylate or methacrylate ester monomers and a source of free radicals such as a peroxide or hydroperoxide. The second part of the composition comprises an activator for initiation of polymerization of the monomers at room temperature. Preferably, the activator is one which can be used in non-stoichiometric quantities with respect to the monomers.

In one particularly preferred method of using multi-part reactive fluid adhesives, the second part comprising the activator can be applied to the surface(s) to be bonded as a primer before applying the first part of the composition. This method avoids the necessity of mixing the parts prior to application. In effectively using adhesive compositions described above, closely complementary surfaces are usually required in order to achieve the most acceptable bond strengths. Gap filling properties of the adhesive compositions for example may be less than adequate to permit satisfactory high strength adhesive bonds between surfaces spaced more than about 0.5 mm (0.05 cm) apart. Such gaps may occur particularly with rougher surfaces.

It is believed that these gap filling disadvantages may result because polymerization of the monomers used in such a method begins at the surfaces of the layers of the first and second parts of the composition. At these surfaces, the monomers, peroxide and activators are in contact, and continued polymerization through the body of the layer is hindered by a number of factors related to the nature of the chemical ingredients used, their physical disposition to each other in the composition and the characteristics of the curing phenomenon.

BRIEF SUMMARY OF THE INVENTION

One embodiment of the present invention provides improved, novel methods for using multi-part adhesive compositions as described above to provide laminates having high strength adhesive bonds between substrate surfaces spaced apart from each other by comparatively wide gaps. In accordance with this embodiment, strong adhesive bonds may be achieved with such adhesives between spaced apart surfaces, by using one or more activator carrying elements. According to the methods, the activator carrying element(s) is positioned between layers of the first part of the adhesive composition and activator carrying elements and layers of the first part can be built up in the gap between the spaced apart surfaces, to provide effective bonding between the surfaces by the cured or polymerized residue of the adhesive composition. A further advantage of the methods is that they provide the capability of using the activator compound portion of the adhesive as a preformed solid rather than a liquid.

Another embodiment of the invention provides improved novel laminates prepared by the method. Essentially, the improved laminates comprise two substrates with opposed surfaces bonded together by at least two layers comprising the polymerized residue of a multi-part reactive fluid adhesive composition with the activator carrying element bonded between adjacent surfaces of the at least two layers.

DESCRIPTION OF THE PREFERRED EMBODIMENTS

Figure 1:
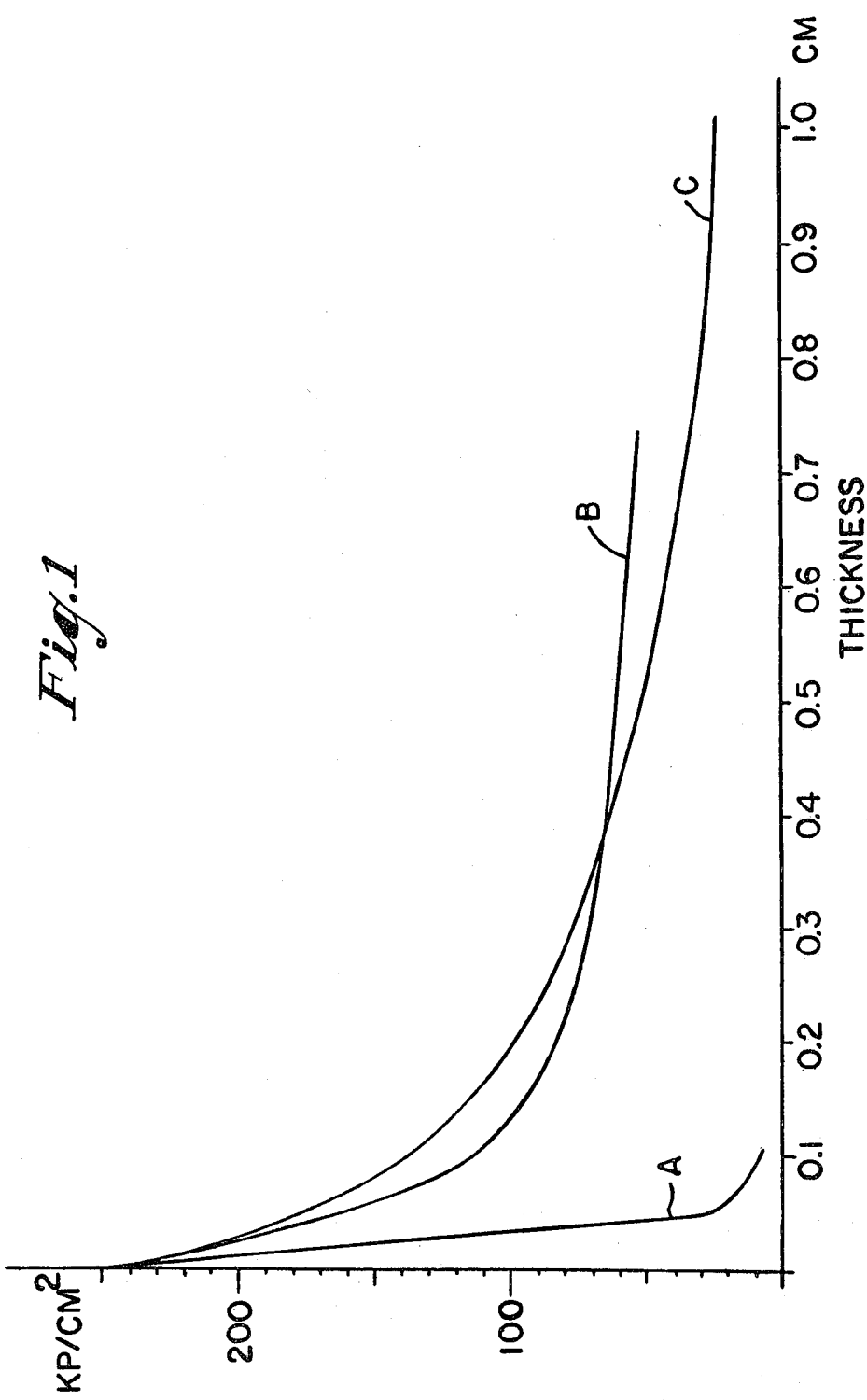
FIG. 1 is a graphical presentation of data obtained in Example 1.

Adhesive compositions used in the practice of the invention are those comprising ethylenically unsaturated monomers which polymerize by a free radical mechanism, for example polymerizable vinyl monomers. For the purpose of this invention "vinyl monomers" include acrylic monomers and mixtures of monomers, such as methyl methacrylate, ethyl methacrylate, acrylonitrile, methacrylonitrile, methyl acrylate, ethyl acrylate, butyl methacrylate, cyclohexyl methacrylate, hexyl methacrylate, 2-ethylhexyl methacrylate, lauryl methacrylate, butyl acrylate, cyclohexyl acrylate, hexyl acrylate, 2-ethylhexyl acrylate, lauryl acrylate, methacrylic acid, acrylic acid, glycidyl methacrylate itaconic acid, ethylene glycol and higher-glycol acrylates and methacrylates, acrylamide, and methacrylamide, halogenated monomers such as vinylidene chloride, chlorostyrene, 2,3-dichloro-1,3-butadiene, and 2-chloro-1,3-butadiene, and styrene and mono- and polyalkylstyrenes, such as methyl-styrene, dimethylstyrene, ethylstyrene, or tert-butyl-styrene. Some of the above compounds are not, from a strictly chemical standpoint, "vinyl" monomers, but are regarded as such in the plastics art. The term "vinyl monomer" is used here in that sense.

The preferred monomers are acrylic monomers, (i.e. acrylic or methacrylic acid or a derivative of either of these), especially $C_{1-8}$ alkyl acrylates and methacrylates. Small amounts of ethylene glycol diacrylate and dimethacrylate may also be included.

Preferred adhesive compositions are those which also comprise polymeric materials for example chlorosulphonated polyethylene or a mixture of sulphonyl chloride with chlorinated polyethylene as more fully described in UK Pat. No. 1436888.

A source of free radicals may be provided for example by an organic peroxide, e.g. an organic hydroperoxide, a perester, or a peracid. The preferred free radical generators are organic peroxides, e.g. 2,5-dimethyl-2,5-di(t-butylperoxy)hexane, and hydroperoxides, e.g. cumene hydroperoxide.

Activator compounds of adhesive compositions for use in a method according to the invention may comprise for example a tertiary amine such as N,N-dimethyl-aniline, N,N-diethylaniline, N,N-diisopropyl (p-toluidine), or a condensation product of an aldehyde and a primary or secondary amine for example a condensation product of butyraldehyde with aniline or butylamine, or a condensation product of crotonaldehyde and aniline, examples of which include DuPont accelerators 808 and 833 and Vulcazit 576 from Bayer AG.

The activator carrying elements used in the practice of this invention may comprise for example a woven or non-woven fabric of natural or synthetic fibrous materials such as cotton, glass fibers, nylon or other fibers, or a polyurethane foam. The material, and nature of the web is not especially critical. However, it is preferred that the activator carrying element be flexible and have a sufficiently open structure to allow the adhesive composition to penetrate the element. The individual surfaces of component parts of the carrier element however, should not be so widely spaced as to inhibit satisfactory curing of adhesive which penetrates the activator carrying element. A preferred web material providing maximum strength of adhesive bond together with a degree of reinforcement for the bond, is a non-woven cotton fleece in which the individual strands are disposed with their surfaces not more than 5 mm from each other.

The activator carrying element can be prepared by treating the web with a solution of the activator compound, in volatile organic solvent, for example by a dipping process. The solvent is then evaporated to provide the activator carrying element. Preferrably a polymeric material is used as a protective material for the activator on the activator carrying element. The polymeric binder should be compatible with the first part of the adhesive composition and dissolve in the adhesive during the bonding process. Methyl methacrylate polymer is particularly preferred as a polymeric binder.

In preferred methods of the invention the adhesive composition includes a promoter, i.e. a material effective to shorten the time required for curing of the adhesive composition. Promoters include organic compounds of transition metals for example cobalt, nickel, manganese or iron napthenates, copper octoate, iron hexoate, or iron propionate, or complexes of acetyl acetone with iron, copper or cobalt. The promoter is preferably included in the second part of the adhesive composition, and included in the solution employed to treat the carrier element.

Preferred activator carrying elements for use in a method of the invention are dimensionally and chemically stable under normal conditions of storage and may be stored for periods of many months under dry conditions for example at temperatures of 10° C. to 30° C.

It will be apparent that curing of the adhesive composition is initiated by admixture of the monomeric material, the source of free radicals, and the activator compound by a so-called free radical mechanism, and the ingredients are not required to be present in stoichiometric quantities. It is, however, necessary to ensure that sufficient activator compound is present on the activator carrying element to effect formation of sufficient free radicals to initiate the polymerization. It has been found for example that a deposit of DuPont accelerator 808 to an extent of from 1 g to 100 g per square meter of activator carrying element is sufficient for many bonding purposes. Similarly, the amount of promoter present is not critical, and is selected in accordance with the speed of cure required.

In a method according to the invention, a first part of the adhesive composition may be applied to the surface of each substrate to be bonded. The activator carrying element(s) is then positioned between the substrates, and the substrates pressed together with the activator carrying element between them. The substrates may be of metal or plastics material. Preferably, surfaces of the substrates are treated with a solution of activator compound prior to application of the first part of the adhesive compound. This solution of activator may be the same as that employed for providing the activator carrying element. When greater thicknesses of adhesive bond are desired, more than one carrier element may be positioned between the substrates. In this arrangement each activator carrying element will be sandwiched or positioned between layers of the first part of the adhesive composition.

The invention and manners of making and using it will be more fully appreciated by reference to the following illustrative, non-limiting example.

EXAMPLE I

Two activator carrying elements were prepared. One activator carrying element (hereafter identified as "Element 1.") comprised a web 25 mm by 12.5 mm by 1 mm of non-woven fleece designated Colback S (supplied by Enka - Glanzstoff) comprising cotton strands 0.05 mm in diameter spaced apart by less than 1 mm.

A second activator carrying element (hereafter identified as "Element 2.") comprised a mat 25 mm by 12.5 mm by 1.5 mm of non-woven glass fiber strands 0.1 mm in diameter spaced apart less than 1 mm.

The activator compound applied to each element was Accelerator 808 supplied by DuPont de Nemours Company and believed to be a condensation product of anilene and butyraldehyde. A solution of a second part of the adhesive composition was used to apply the activator to each carrier and the solution contained the following ingredients:

TABLE 1

| Ingredients | Parts by weight |
|---|---|
| Accelerator 808 | 10 |
| Polymeric binder | 10 |
| Volatile organic solvent | 80 |

The polymeric binder used was a polymethyl methacrylate of molecular weight 15,000, and the solvent used was acetone.

Each carrier was dipped into and remained immersed in the solution for 30 seconds. After evaporation of the solvent, Element 1. was found to have a deposit of 75 g/m$^2$ in equal parts by weight of activator compound and polymeric binder on the carrier. After evaporation of the solvent, Element 2 was found to have a deposit of 120 g/m$^2$ in equal parts by weight of activator compound and polymeric binder was present on the carrier. Elements 1 and 2 prepared as described were flexible, non-tacky and capable of storage in layers or as a roll.

A first part of the adhesive composition used to illustrate methods of bonding according to this invention comprised the following ingredients:

TABLE 2

| Ingredient | Parts by weight |
|---|---|
| Methyl methacrylate | 40 |
| Methacrylic acid | 20 |
| Chlorosulphonated polyethylene | 40 |
| Cumene hydroperoxide | 1 |

The chlorosulphonated polymer used was Hypalon 30 supplied by E. I. DuPont de Nemours Company which is said to comprise 43% by weight chlorine and 1.1% by weight sulphur. The first part of the adhesive composition was a liquid having a viscosity of 2,500 centipoises at 25° C.

A method for forming steel to steel substrates bonds according to the invention is as follows: Steel strips were cleaned with acetone, and a layer of the second part of the adhesive composition (Table I) was painted on the surfaces to be bonded. After evaporation of the solvent, a 1 mm thick layer of the first part of the adhesive composition (Table 2) was applied to each surface. Element 1 was placed on the first part layer on one of the surfaces, and the pieces of steel pressed together with Element 1 between the first part layers. After 240 seconds it was observed that the pieces of steel were strongly bonded together.

In order to examine the strength of adhesive bonds formed by this method, several bonds were made between steel strips 25 mm by 12.5 mm in the following way. For each sample, the steel strips were cleaned with acetone and a surface of each strip treated with the second part of the adhesive composition (Table I) as described above. For comparative purposes, several sample bonds (set A) were prepared by applying a layer of the first part of the adhesive composition (Table 2) to the treated surface of one of the prepared steel strips, applying the treated surface of the second prepared steel strip to the applied first part layer and pressing the strips together until the bonded strips were parallel and separated from each other by distances up to 1 mm.

A second set of sample bonds (set B) was prepared, using Element 1. In preparing set B, a layer 1 mm thick of the first part of the adhesive composition (Table 2) was applied to a surface of each prepared steel strip. Element 1. was laid on the applied first part layer and another layer 1 mm thick of the first part of the adhesive composition (Table 2) was applied to the surface of Element 1. The thickness of the sample bonds of set B were varied by progressively increasing the number of Element 1 and first part layers with each added Element 1. being sandwiched between adjacent first part layers. When the desired thickness of bond was reached and the final Element 1. had been applied and coated with a layer of the first part of the composition, the treated surface of the second steel strip was positioned on the first part layer and the assembly pressed together under a pressure of 10 Kp with the steel strips parallel and spaced apart by thicknesses up to 10 mm.

A third set of samples (set C) was prepared in the same way as sample set B but using Element 2 rather than Element 1 as the activator carrying element.

The sample bonds were aged at 23° C. for 24 hours.

The tensile shear strength of the aged samples was determined using an Instron machine set to separate the bonds at a rate of 1 mm/minute. The results are shown in FIG. 1 in graph form, the spacing between the steel plates for each sample, i.e. the bond thickness, being designated in cm as "thickness", and the force required to separate the bonds being designated in Kiloponds per square centimeter.

From FIG. 1 it is observed that with the samples of set A, values of 40 $Kp/cm^2$ or more can be achieved only if the adhesive bond thickness is less than about 0.05 cm. The value of 40 $Kp/cm^2$ can be regarded as indicating a lower limit of tensile shear strength for general purpose adhesives for many applications. It is further noted that with the samples of set C, values of 40 $Kp/cm^2$ may be achieved with bond thickness as large as 0.6 cm and that with the samples of set B, values of 40 $Kp/cm^2$ may be achieved with bond thicknesses as large as 0.7 cm.

We claim:

1. A laminate comprising two substrates with opposed surfaces spaced apart from each other by a distance greater than about 0.05 cm and bonded together by the polymerized residue of a multi-part adhesive composition having a first part comprising vinyl monomer material polymerizable to a solid state in the presence of free radicals under the influence of a non-stoichiometric quantity of an activator compound for initiating polymerization of the monomer, and having a second part comprising an activator compound for initiating polymerization of said monomer material, and a plurality of layers of woven or non-woven fabric of natural or synthetic fibrous materials each positioned between adjacent opposed surfaces of two layers of said first part and bonded to said layers.

2. A laminate of claim 1 where the activator comprises a condensation product of an aldehyde and a primary or secondary amine.

3. A laminate of claim 1 where the monomer material of the first part comprises methyl methacrylate and methacrylic acid.

4. A laminate of claim 3 where the first part also comprises chlorosulphonated polyethylene.

5. A flexible, non-tacky activator carrying element capable of storage in layers or as a roll and for use in a multi-part adhesive composition having one part comprising a vinyl monomer material polymerizable to a solid state in the presence of free radicals under the influence of a non-stoichiometric quantity of an activator compound capable of initiating polymerization of said monomer material, said element comprising a woven or non-woven fabric of natural or synthetic fiberous material carrying an activator for said monomer material in solid form.

6. An element of claim 5 further including a polymeric binder material.

7. An element of claim 5 where the activator is a tertiary amine or a condensation product of an aldehyde and a primary or secondary amine.

8. An element of claim 5 where the fabric is one in which the individual strands are disposed with their surfaces not more than 5 mm from each other.

9. An element of claim 5 further including a promoter for the adhesive composition.

10. In a method of bonding together two substrates using a multi-part adhesive composition having a first part comprising vinyl monomer material polymerizable to a solid state in the presence of free radicals under the influence of a non-stoichiometric quantity of an activator compound for initiating polymerization of the monomer, and having a second part comprising an activator compound for initiating polymerization of said monomer material, the improvement which comprises the step of interposing between opposed surfaces of the substrates, flexible, non-tacky, activator carrying elements with each interposed element arranged in contact with layers of the first part so that the distance between opposed surfaces is greater than about 0.05 cm and pressing the substrates together to provide an adhesive bond formed by the first and second part between the substrates and where said activator carrying element comprises a woven or non-woven fabric of natural or synthetic fibrous material carrying said activator as a solid.

11. A method of claim 10 where the opposed surfaces are coated with a layer of activator compound and coatings of the first part are applied to the activator containing layer.

12. A method of claim 10 where a plurality of activator carrying elements are interposed between the substrates with each element in contact with layers of the first part.

13. A method of claim 10 where the activator carrying element also carries a polymeric binder compatible with the first part.

14. A method of claim 10 where the activator carried by the activator carrying element comprises a condensation product of an aldehyde and a primary or secondary amine.

15. A method of claim 10 where the monomer material of the first part comprises methyl methacrylate and methacrylic acid.

16. A method of claim 15 where the first part also comprises chlorosulphonated polyethylene.

17. A method of claim 10 where the activator carrying element comprises a fabric in which the individual strands are disposed with their surfaces not more than about 5 mm from each other.

* * * * *